United States Patent [19]

Rifi et al.

[11] Patent Number: 5,677,375
[45] Date of Patent: Oct. 14, 1997

[54] PROCESS FOR PRODUCING AN IN SITU POLYETHYLENE BLEND

[75] Inventors: Mahmoud R. Rifi, Kendall Park; Carlo F. Martino, Somerville, both of N.J.

[73] Assignee: Union Carbide Chemicals & Plastics Technology Corporation, Danbury, Conn.

[21] Appl. No.: 625,612

[22] Filed: Mar. 29, 1996

Related U.S. Application Data

[60] Provisional application No. 60/001,366, Jul. 21, 1995.
[51] Int. Cl.$^6$ .................................................. C08F 297/06
[52] U.S. Cl. ..................... 525/53; 525/247; 525/268; 525/320; 525/324; 524/474; 524/477; 524/490; 524/491; 524/536
[58] Field of Search ........................ 524/474, 477, 524/490, 491, 536; 525/53, 247, 268, 320, 324

[56] References Cited

U.S. PATENT DOCUMENTS

| | | |
|---|---|---|
| 3,203,921 | 8/1965 | Rosenfelder . |
| 3,374,290 | 3/1968 | Franke et al. . |
| 3,665,068 | 5/1972 | Duling et al. . |
| 3,923,947 | 12/1975 | Cook . |
| 4,010,127 | 3/1977 | Taka et al. . |
| 4,263,196 | 4/1981 | Schumacher et al. . |
| 4,343,755 | 8/1982 | Miller et al. . |
| 4,467,010 | 8/1984 | Shii et al. . |
| 4,536,537 | 8/1985 | Klingensmith et al. . |
| 4,539,374 | 9/1985 | Fenton et al. . |
| 4,622,350 | 11/1986 | Icenogle et al. . |
| 4,703,078 | 10/1987 | Maehara et al. . |
| 4,774,277 | 9/1988 | Janac et al. . |
| 4,870,123 | 9/1989 | Nelson . |
| 5,076,988 | 12/1991 | Rifi . |
| 5,290,745 | 3/1994 | Jorgensen et al. ............ 502/109 |
| 5,326,602 | 7/1994 | Rifi . |
| 5,405,901 | 4/1995 | Daniell et al. ............... 525/53 |

FOREIGN PATENT DOCUMENTS

| 1943921 | 3/1971 | Germany . |
|---|---|---|

OTHER PUBLICATIONS

White Oils etc, Witco Corporation brochure, 10 pages, 1994.

Primary Examiner—Romulo H. Delmendo
Attorney, Agent, or Firm—Saul R. Bresch

[57] ABSTRACT

A gas phase process for the production of an in situ polyethylene blend comprising contacting ethylene and at least one alpha-olefin comonomer having 3 to 8 carbon atoms with a magnesium/titanium based catalyst system including an activator and a cocatalyst in each of two fluidized bed reactors corrected in series, under polymerization conditions, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (f), no additional catalyst is introduced into the second reactor;

(c) in the first reactor in which a relatively high molecular weight copolymer is made:
  (1) the alpha-olefin is present in a ratio of about 0.01 to about 0.4 mole of alpha-olefin per mole of ethylene; and
  (2) optionally, hydrogen is present in a ratio of about 0.001 to about 0.3 moles of hydrogen per mole of ethylene;

(d) in the second reactor in which a relatively low molecular weight copolymer is made:
  (1) the alpha-olefin is present in a ratio of about 0.01 to about 0.6 mole of alpha-olefin per mole of ethylene; and
  (2) hydrogen is present in a ratio of about 1 to about 2.5 moles of hydrogen per mole of ethylene;

(e) a sufficient amount of one or more hydrocarbons is added to the first reactor or to the mixture formed in the first reactor prior to its introduction into the second reactor to provide about 0.5 to about 15 parts by weight of hydrocarbon(s) per 100 parts by weight of the in situ blend, each of said hydrocarbons being a saturated alicyclic hydrocarbon, which is liquid at process temperature, is non-polar, is essentially amorphous, and contains less than about 15 percent by weight paraffin wax; and (f) additional hydrocarbyl aluminum cocatalyst is introduced into the second reactor in an amount sufficient to restore the level of activity of the catalyst transferred from the first reactor to about the initial level of activity in the first reactor.

10 Claims, No Drawings

PROCESS FOR PRODUCING AN IN SITU POLYETHYLENE BLEND

This application claims the benefit of United States Provisional Application numbered 60/001,366 filed on Jul. 21, 1995.

TECHNICAL FIELD

This invention relates to a process for preparing an in situ polyethylene blend, which can be converted into film having a small number or essentially no gels (or fish-eyes).

BACKGROUND INFORMATION

There has been a rapid growth in the market for linear low density polyethylene (LLDPE), particularly resin made under mild operating conditions; typically at pressures of 100 to 300 psi and reaction temperatures of less than 100° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomer in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process similar to those described in U.S. Pat. Nos. 5,047,468 and 5,149,738. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) an aluminum containing activator compound; and (iii) a hydrocarbyl aluminum cocatalyst.

While the in situ blends prepared as above and the films produced therefrom are found to have the advantageous characteristics heretofore mentioned, the commercial application of these granular bimodal polymers is limited by unacceptable levels of gels in contrast to competitive bimodal resins produced from slurry or solution processes. Particle size distribution and flow characteristics studies indicate that the gas phase resins having an average particle size (APS) of about 400 to about 600 microns exhibit significant compositional, molecular, and rheological heterogeneities. When such a granular resin is compounded, for example, with a conventional twin screw mixer in a single pass, and the resulting pellets are fabricated into film, the film exhibits a high level of gels ranging in size from less than about 100 microns to greater than about 500 microns. These gels adversely effect the aesthetic appearance of the product. The gel characteristics of a film product are usually designated by a subjective scale of Film Appearance Rating (FAR) varying from minus 50 (very poor; these films have a large number of large gels) to plus 50/plus 60 (very good; these films have a small amount of, or essentially no, gels). The FAR of the single pass film product mentioned above is generally in the range of about minus 50 to about minus 10/0. For commercial acceptability, the FAR should be plus 20 or better.

DISCLOSURE OF THE INVENTION

An object of this invention, therefore, is to provide a process for preparing an in situ blend, which can be extruded into a film having a commercially acceptable FAR. Other objects and advantages will become apparent hereinafter.

According to the present invention such a process has been discovered. The process comprises contacting ethylene and at least one alpha-olefin comonomer having 3 to 8 carbon atoms with a magnesium/titanium based catalyst system including an activator and a cocatalyst in each of two fluidized bed reactors connected in series, in the gas phase, under polymerization conditions, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (f), no additional catalyst is introduced into the second reactor;

(c) in the first reactor in which a relatively high molecular weight copolymer is made:
  (1) the alpha-olefin is present in a ratio of about 0.01 to about 0.4 mole of alpha-olefin per mole of ethylene; and
  (2) optionally, hydrogen is present in a ratio of about 0.0001 to about 0.3 mole of hydrogen per mole of ethylene;

(d) in the second reactor in which a relatively low molecular weight copolymer is made:
  (1) the alpha-olefin is present in a ratio of about 0.005 to about 0.6 mole of alpha-olefin per mole of ethylene; and
  (2) hydrogen is present in a ratio of about 1 to about 3 moles of hydrogen per mole of ethylene;

(e) a sufficient amount of one or more hydrocarbons is added to the first reactor or to the mixture formed in the first reactor prior to its introduction into the second reactor to provide about 0.5 to about 15 parts by weight of hydrocarbon(s) per 100 parts by weight of the in situ blend, each of said hydrocarbons being a saturated alicyclic hydrocarbon, which is liquid at process temperature, is non-polar, is essentially amorphous, and contains less than about 15 percent by weight paraffin wax; and (f) additional hydrocarbyl aluminum cocatalyst is introduced into the second reactor in an amount sufficient to restore the level of activity of the catalyst transferred from the first reactor to about the initial level of activity in the first reactor.

DESCRIPTION OF THE PREFERRED EMBODIMENT(S)

As noted, the blend is produced in two staged reactors connected in series wherein a mixture of resin and catalyst precursor is transferred from the first reactor to the second reactor in which another copolymer is prepared and blends in situ with the copolymer from the first reactor.

The copolymers produced in each of the reactors are copolymers of ethylene and at least one alpha-olefin comonomer having 3 to 8 carbon atoms, preferably one or two alpha-olefin comonomers. The alpha-olefins can be, for example, propylene, 1-butene, 1-hexene, 4-methyl-1-pentene, and 1-octene.

Preferred comonomer combinations:

| first reactor | second reactor |
|---|---|
| 1-hexene | 1-hexene |
| 1-butene | 1-hexene |
| 1-butene | 1-butene |
| 1-hexene | 1-butene |

The 1-hexene/1-hexene combination is found to give the best film properties; however, the 1-hexene/1-butene combination is found to provide acceptable properties while still meeting FDA specifications since a terpolymer increases the FDA allowable comonomer content, e.g., for a 1-hexene copolymer, the maximum allowable comonomer content is 10 percent by weight whereas for a 1-hexene/1-butene terpolymer, the maximum allowable comonomer content is 15 percent by weight. For FDA purposes, the 1-hexene/1-hexene combination is considered a copolymer and the 1-hexene/1-butene combination is considered a terpolymer.

It will be understood that the in situ blend, which includes the aforementioned hydrocarbon(s) can be characterized as a trimodal resin. The properties of trimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance).

The magnesium/titanium based catalyst system can be exemplified by the catalyst system described in U.S. Pat. No. 4,302,565. The precursor can be supported or unsupported. Another catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral off to provide the slurry form. This is described in U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic add, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is often used with any of the titanium based catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture [including the hydrocarbon(s)] is transferred to the second reactor. Insofar as the catalyst is concerned, only cocatalyst is added to the second reactor from an outside source.

The polymerization in each reactor is, preferably, conducted in the gas phase using a continuous fluidized process.

A relatively low melt index (or relatively high molecular weight) copolymer is prepared in the first reactor. The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium. Alternatively, the low molecular weight copolymer is prepared in the first reactor and the high molecular weight copolymer is prepared in the second reactor.

In the high molecular weight reactor:

Because of the low values, instead of melt index, flow index is determined and those values are used in this specification. The flow index can be in the range of about 0.01 to about 30 grams per 10 minutes, and is preferably in the range of about 0.2 to about 12 grams per 10 minutes. The molecular weight of this polymer is, generally, in the range of about 135,000 to about 445,000. The density of the copolymer can be at least 0.860 gram per cubic centimeter, and is preferably in the range of 0.900 to 0.940 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or relatively low molecular weight) copolymer is prepared in this reactor. The high melt index can be in the range of about 50 to about 3000 grams per 10 minutes, and is preferably in the range of about 50 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.975 gram per cubic centimeter. The melt flow ratio of this copolymer can be in the range of about 20 to about 70, and is preferably about 20 to about 45.

The blend or final product, as removed from the second reactor, can have a melt index in the range of about 0.02 to about 3.5 grams per 10 minutes, and preferably has a melt index in the range of about 0.04 to about 2.0 grams per 10 minutes. The melt flow ratio is in the range of about 55 to about 135, and is preferably in the range of about 55 to about 125. The molecular weight of the final product is, generally, in the range of about 90,000 to about 450,000. The density of the blend is at least 0.915 gram per cubic centimeter, and is preferably in the range of 0.916 to 0.960 gram per cubic centimeter.

The blend has a broad molecular weight distribution which can be characterized, in view of the hydrocarbon addition, as trimodal. The broad molecular weight distribution is reflected in an Mw/Mn ratio of about 10 to about 80, preferably about 20 to about 60. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 0.67:1 to about 2:1, and is preferably in the range of about 0.75:1 to about 1.6:1. The optimum weight ratio is about 1:1. This is also known as the split.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor, i.e., the first reactor:

The mole ratio of alpha-olefin to ethylene can be in the range of about 0.01:1 to about 0.4:1, and is preferably in the range of about 0.02:1 to about 0.26:1. The mole ratio of hydrogen (if used) to ethylene can be in the range of about 0.0001:1 to about 0.3:1, and is preferably in the range of about 0.017:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor, i.e., the second reactor:

The mole ratio of alpha-olefin to ethylene can be in the range of about 0.005:1 to about 0.6:1, and is preferably in the range of about 0.01:1 to about 0.42:1. The mole ratio of hydrogen to ethylene can be in the range of about 1.0:1 to about 3:1, and is preferably in the range of about 1.7:1 to about 2.2:1. The operating temperature is generally in the range of about 70° C. to about 110° C. As mentioned above, the temperature is preferably varied with the desired density.

The pressure is generally the same in both the first and second reactors. The pressure, i.e., the total pressure in the reactor, can be in the range of about 200 to about 450 psi and is preferably in the range of about 280 to about 350 psig.

A technique for increasing the modality of the polyethylene and improving other properties thereof is to introduce various additives into the polyethylene. The preferred additive is a saturated alicyclic hydrocarbon. On addition of the hydrocarbon, the polyethylene or mixture of polyethylenes increase their modality, for example, from monomodal to bimodal and from bimodal to trimodal. Thus, the post-blend polyethylene(s) can be characterized as multimodal.

As noted, a sufficient amount of one or more hydrocarbons is added to the first reactor or to the mixture formed in the first reactor prior to its introduction into the second reactor to provide about 0.5 to about 15 parts by weight of hydrocarbon(s) per 100 parts by weight of the in situ blend, and preferably 3 to 12 parts by weight. These values refer to total hydrocarbon(s) and total polyethylene(s) in the in situ blend. To obtain these proportions in the in situ blend, the amount of hydrocarbon(s) introduced into the first reactor or prior to the second reactor can be about 3 to about 30 parts by weight of hydrocarbon(s) per 100 parts by weight of the mixture formed in the first reactor, and the hydrocarbon(s) are preferably introduced in an amount of about 4 to about 20 parts by weight of hydrocarbon(s) per 100 parts by weight of the mixture formed in the first reactor.

As noted above, the hydrocarbons are saturated alicyclic hydrocarbons. They are unsubstituted. Alicyclic hydrocarbons are mixtures of aliphatic and cycloaliphatic hydrocarbons. The hydrocarbons are generally liquid at ambient temperatures; are liquid at process temperature, non-polar, essentially amorphous, and contain less than 15 percent by weight paraffin wax, preferably less than one percent by weight paraffin wax. No paraffin wax would be most preferable, but this is not considered practical or necessary for the composition applications. The liquid hydrocarbons can have a viscosity in the range of about 200 to about 1000 SUS (Saybolt Universal Seconds) at 100° F. (37.8° C.) and preferably have a viscosity in the range of about 250 to about 800 SUS at 100° F. Examples of these hydrocarbons are Kaydol® 350, 380, and 550 hydrocarbons. Other examples are Tufflo® 6056 and 6026 hydrocarbons. It is noted that the Tufflo® hydrocarbons do not comply with the FDA regulation for food contact. Kaydol® 350 hydrocarbon is reported to contain 11.8 percent by weight paraffin wax and Kaydol® 550 hydrocarbon is reported to contain less than one percent by weight paraffin wax. The molecular weight of these hydrocarbons is in the range of about 200 to about 5000. The hydrocarbon(s) can be present in the mixture of polyethylene(s) and hydrocarbon(s) in an amount of about 0.5 to about 15 parts by weight of hydrocarbon(s) per 100 parts by weight of polyethylene(s), and are preferably present in an amount of about 3 to about 12 parts by weight. These values refer to total hydrocarbons and total polyethylenes. In any case, the amount of hydrocarbon(s) should be such that the surface of each particle of polyethylene resin is essentially free of these hydrocarbon(s). The hydrocarbon(s) are also miscible with the polyethylene at process temperatures, and, in the suggested proportions, reside in the amorphous phase of the polyethylene. Kaydol® 350 hydrocarbon has a viscosity of 350 SUS at 100° F.; a molecular weight of 800; and a density of 0.877 gram per cubic centimeter. Kaydol® 380 hydrocarbon has a viscosity of 380 SUS at 100° F.; a molecular weight of 900; and a density of 0.885 gram per cubic centimeter. Tufflo® 6056 hydrocarbon has a viscosity of 460 SUS at 100° F.; a molecular weight of 720; and a density of 0.8692 gram per cubic centimeter.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid (in an inert gas carrier) or slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate.

The hydrogen:ethylene molar ratio can be adjusted to control average molecular weights. The alpha-olefins (other than ethylene) can be present in a total mount of up to 15 percent by weight of the copolymer and are preferably included in the copolymer in a total amount of about 1 to about 10 percent by weight based on the weight of the copolymer.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The residence time of the mixture of reactants including gaseous and liquid reactants, catalyst, and resin in each fluidized bed can be in the range of about 1 to about 12 hours and is preferably in the range of about 2 to about 5 hours.

The resin blend can be extruded into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. For the purposes of this specification, extrusion processes shall be considered to include conventional extrusion processes such as blown tubular film extrusion and pipe and sheet extrusion, and blow molding, injection molding, rotational molding, and slot casting. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C.

A description of typical injection molding apparatus can be found in the Injection Molding Handbook, edited by Rosato et al, published by Van Nostrand, New York, 1986, pages 10 and 11, and Injection Molding, Rubin, published by John Wiley & Sons, New York, 1972, pages 5 and 6. Typical conditions are described in U.S. Pat. No. 4,390,677.

A description of a typical blow molding apparatus can be found in the Blow Molding Handbook, edited by Rosato et al, published by Oxford University Press, New York, 1989. Typical conditions are described at pages 530 to 535.

One advantage of the invention is found in the film prepared from the resin blend in that FAR values of plus 20 or higher are consistently achieved. Thus, the resulting film has essentially no or few gels. Other advantages are improved homogeneity of the blend with an attendant improvement in many of the improved properties achieved in dry or melt blending; an increase in the average particle size of the resin; a slight decrease in bulk density; a decrease in fines; no apparent effect on the removal of residual comonomer; an increase in flow index; a decrease in density; and a reduction in static.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend. These additives can be added to the in situ blend prior to or during the extrusion step, and, in some cases, directly to the polymerization reactor. One method for reactor addition involves first blending the desired additive(s) with the hydrocarbon(s) and then introducing the blend into the reactor. Stabilization packages are advantageously added in this way when reactor addition is practicable.

Patents mentioned in this specification are incorporated by reference herein.

The invention is illustrated by the following example.

EXAMPLE

An in situ blend of two copolymers of ethylene and 1-hexene is prepared in two fluidized bed reactors with the following catalyst:

A titanium trichloride catalyst precursor is prepared in a 1900 liter vessel equipped with pressure and temperature controls and a turbine agitator. A nitrogen atmosphere (less than 5 ppm $H_2O$) is maintained at all times.

1480 liters of anhydrous tetrahydrofuran (THF) containing less than 40 ppm $H_2O$ are added to the vessel. The THF is heated to a temperature of 50 degrees C., and 1.7 kilograms of granular magnesium metal (70.9 gram atoms) are added, followed by 27.2 kilograms of titanium tetrachloride (137 mols). The magnesium metal has a particle size in the range of from 0.1 to 4 millimeters. The titanium tetrachloride is added over a period of about one-half hour.

The mixture is continuously agitated. The exotherm resulting from the addition of titanium tetrachloride causes the temperature of the mixture to rise to approximately 72 degrees C. over a period of about three hours. The temperature is held at about 70 degrees C. by heating for approximately another four hours. At the end of this time, 61.7 kilograms of magnesium dichloride (540 mols) are added and heating is continued at 70 degrees C. for another eight hours. The mixture (solution) is then filtered through a 100 micron filter to remove undissolved magnesium dichloride and unreacted magnesium (less than 0.5 percent by weight).

100 kilograms of fumed silica having a particle size in the range of from 0.1 to 1 microns are added to the mixture prepared above over a period of about two hours. The mixture is stirred by means of a turbine agitator during this time and for several hours thereafter to thoroughly disperse the silica in the solution. The temperature of the mixture is held at 70 degrees C. throughout this period and a nitrogen atmosphere is maintained at all times.

The resulting slurry is spray dried using an 8-foot diameter closed cycle spray dryer equipped with a rotary atomizer. The rotary atomizer is adjusted to give catalyst particles with a D50 of 12 microns. The scrubber section of the spray dryer is maintained at approximately minus 4 degrees C.

Nitrogen gas is introduced into the spray dryer at an inlet temperature of 140 degrees C. and is circulated at a rate of approximately 1700 kilograms per hour. The catalyst slurry is fed to the spray dryer at a temperature of about 35 degrees C. and a rate of 90 to 95 kilograms per hour, or sufficient to yield an outlet gas temperature of approximately 100 degrees C. The atomization pressure is slightly above atmospheric. Discrete spray dried catalyst precursor particles are formed.

The spray dried catalyst contains 2.5 weight percent Ti, 6.3 weight percent Mg, and 29.2 weight percent THF. The particles have a D10 of 8 microns, a D50 of 12 microns, and a D90 of 18.6 microns as determined by means of a Leeds and Northrup Microtrac™ particle size analyzer using a dodecane solvent.

The discrete catalyst precursor particles are mixed with mineral oil under a nitrogen atmosphere in a 400 liter vessel equipped with a turbine agitator to form a slurry containing approximately 28 weight percent of the solid catalyst precursor. A 50 weight percent solution of tri-n-hexylaluminum in mineral oil is added and the slurry is stirred for one hour. The tri-n-hexylaluminum solution is employed in an amount sufficient to provide 0.2 mol of tri-n-hexylaluminum per mol of THF in the catalyst. A 30 weight percent solution of diethylaluminum chloride (DEAC) in mineral oil is then added and the mixture is stirred for another hour. The DEAC is employed in an amount sufficient to provide 0.45 mol of DEAC per mol of THF in the catalyst.

Ethylene is copolymerized with 1-hexene in a fluidized bed reactor. The total pressure in each reactor is 300 psia. Each polymerization is continuously conducted after equilibrium is reached. The temperature is 87 degrees C.; the ethylene partial pressure is 130 psi; the hydrogen/ethylene molar ratio is 0.120; the 1-hexene/ethylene molar ratio is 0.125; and the aluminum/titanium atomic ratio is 36. This is the final Al/Ti atomic ratio in the reactor, and includes the aluminum introduced in the modifier step.

Polymerization is initiated in the first reactor by continuously feeding the catalyst precursor and cocatalyst into a fluidized bed of polyethylene granules together with ethylene, 1-hexene, and hydrogen. The cocatalyst (TEAL) is first dissolved in isopentane (1 to 5 percent by weight cocatalyst). The product blend is continuously removed.

A saturated alicyclic hydrocarbon (SAHC), which is liquid at process temperature, non-polar, essentially amorphous, and contains less than about 15 percent by weight paraffin wax is added as follows. The SAHC has a viscosity of 350 SUS at 100 degrees F.; a density of 0.877 gram per cubic centimeter; and a molecular weight of 800 (it is presently sold as Kaydol® 350 white oil). It also complies with FDA regulations for food contact.

The SAHC is added to the first reactor approximately 2 feet above the distributor plate. It is first dried to a maximum water content of 10 ppm. An existing feed stream is used to feed the SAHC to the reactor. A low injection point allows the SAHC as much time as possible to mix with the copolymer before it is carried into the recycle system. The SAHC is initially fed at a rate of 1 percent by weight of the copolymer. It is then increased to 1.7, 3, 5, 7, 10, and 20 percent by weight with samples of the in situ blend being collected at each level for analysis. As the amount of SAHC is increased, the amount of copolymer produced in the second reactor is decreased. 1-hexene is added to each reactor in amounts sufficient to control the density of the copolymer and hydrogen is added to each reactor in amounts sufficient to control the molecular weight (see above). Thus, the copolymer produced in the first reactor has a density in the range of 0.920 to 0.929 gram per cubic centimeter and the final copolymer produced in the second reactor has a density in the range of 0.942 to 0.949 gram per cubic centimeter. A granular resin is produced in both reactors having an average particle size of 0.01 to 0.02 inch, and the resin appears to have less fines than the same resin produced without the SAHC. It is observed that the granular resin is free flowing, and the surface of each particle is essentially free of SAHC, even at high SAHC concentrations; the level of static is reduced significantly; and the operability of each reactor is much improved.

The granular resin is discharged from the second reactor, stabilized with antioxidants, and compounded. Compounding of the copolymer and SAHC with anti-oxidant, calcium stearate, and zinc stearate can be accomplished with a Prodex™ single screw extruder. The extruder uses a double compounding 2.5 inch screw with a length to diameter ratio of 30:1. Stranding and pelleting is achieved through a 16 strand die head, water bath, air knife, and strand cutter. The molten polymer composition is passed through a screen pack with a series of screens ranging from 20/60/20 mesh to 20/200/20 mesh before going through the die head for stranding. The melt temperature is 480 to 510 degrees F.; the head pressure is 3500 to 4000 psi; the drive amps is 47 to 54; and the output rate is 60 to 70 pounds per hour.

It is found that the resin is trimodal by size exclusion chromatography; polydispersity is greater than 100; the average molecular weight is about 29,000; and the density is 0.948 gram per cubic centimeter.

The compounded resin is extruded into films on an Alpine™ extrusion line having a die size of 100 millimeters; a die gap of 1 millimeter; a screw size of 50 millimeters; and a frost line height (FLH) of about 7 to 10 times the die size, i.e., about 90 centimeters. The blow-up ratio is 4:1. The melt temperature is about 400 degrees F. The extrusion rate is 8 pounds per hour-inch of die circumference. The films are 1, 0.4, and 0.5 mil in thickness.

A resin is prepared in the same manner as the above resin except that the SAHC is not added. The resin is compounded and extruded as above into the same size films, i.e., 1, 0.4, and 0.5 mil films, without the SAHC displayed an FAR (film appearance rating) of minus 40 to minus 50 while a film with 1.7 percent by weight SAHC displayed an FAR of plus 30 to plus 40. FAR is a measure of gel content in film. The gels have a negative effect on the visual appearance of the film. The higher the number of gels, the lower the FAR. In addition, the bubble stability, as measured by the speed of the line in feet of film per minute, is much higher in the resin with the SAHC than the one without, e.g., 180 feet per minute for the resin without the SAHC vs 250 feet per minute for a resin with 1.7 percent by weight SAHC.

The SAHC containing film also displays higher dart drop than films without the SAHC. Dart drops of SAHC containing resin as measured on 0.5 mil films are 295 to 320 grams and dart drops of resins which do not contain SAHC are much lower, i.e., 200 to 240 grams. In addition, the SAHC containing film displays a glossier surface and better clarity than films, which do not contain the SAHC.

Compounded resin samples containing 2 and 5 percent by weight SAHC are tested for printability. The samples are extruded into films using a commercial extrusion line having a grooved 55 millimeter screw with a 2 ½ inch diameter. An 80 mesh screen is used and the output of film is about 100 pounds per hour. Before printing, the films are treated with a corona discharge under normal dosage. A water based Poly-185™ printing ink produced by Graphic Sciences is used. On line printing of both film samples is successful as evidenced by the good adhesion of the ink to the film. Such good adhesion is consistent with the conclusion that there is essentially no SAHC on the surface of the film.

A compounded resin sample without SAHC is tested in the same manner with the same good adhesion of ink to film. Thus, insofar as printability is concerned, films with and without SAHC are equivalent.

Terms used in the example can be described as follows: dart drop is determined under ASTM D-1709; FAR (film appearance rating) is determined by visual comparison with a standard sample in terms of the number of gels per unit area; bubble stability is determined by the speed of the line. The faster the speed (prior to failure) the better the bubble stability; haze is determined under ASTM D-1003; and gloss is determined under ASTM D-2457.

We claim:

1. A gas phase process for the production of an in situ polyethylene blend comprising contacting ethylene and at least one alpha-olefin comonomer having 3 to 8 carbon atoms with a magnesium/titanium based catalyst system including an activator and a cocatalyst in each of two fluidized bed reactors connected in series, under polymerization conditions, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (f), no additional catalyst is introduced into the second reactor;

(c) in the first reactor in which a relatively high molecular weight copolymer is made:
   (1) the alpha-olefin is present in a ratio of about 0.01 to about 0.4 mole of alpha-olefin per mole of ethylene; and
   (2) optionally, hydrogen is present in a ratio of about 0.0001 to about 0.3 mole of hydrogen per mole of ethylene;

(d) in the second reactor in which a relatively low molecular weight copolymer is made:
   (1) the alpha-olefin is present in a ratio of about 0.005 to about 0.6 mole of alpha-olefin per mole of ethylene; and
   (2) hydrogen is present in a ratio of about 1 to about 3 moles of hydrogen per mole of ethylene;

(e) a sufficient amount of one or more hydrocarbons is added to the first reactor or to the mixture formed in the first reactor prior to its introduction into the second reactor to provide about 0.5 to about 15 parts by weight of hydrocarbon(s) per 100 parts by weight of the in situ blend, each of said hydrocarbons being a saturated alicyclic hydrocarbon, which is liquid at the temperature at which polymerization is effected in the reactors, is essentially amorphous, and contains less than about 15 percent by weight paraffin wax; and (f) additional hydrocarbyl aluminum cocatalyst is introduced into the second reactor in an amount sufficient to restore the level of activity of the catalyst transferred from the first reactor to about the initial level of activity in the first reactor.

2. The process defined in claim 1 wherein each hydrocarbon has a viscosity in the range of about 200 to about 1000 SUS at 100 degrees C. and each hydrocarbon has a molecular weight in the range of about 200 to about 5000.

3. The process defined in claim 2 wherein the amount of hydrocarbon(s) introduced is about 3 to about 30 parts by weight of hydrocarbon(s) per 100 parts by weight of the mixture of ethylene copolymer matrix and active catalyst formed in the first reactor.

4. The process defined in claim 2 wherein the polymer formed in the first reactor has a flow index in the range of about 0.01 to about 30 grams per 10 minutes and a density in the range of about 0.860 to about 0.940 gram per cubic centimeter and the polymer formed in the second reactor has a melt index in the range of about 50 to about 3000 grams per 10 minutes and a density in the range of about 0.900 to about 0.975 gram per cubic centimeter, the weight ratio of first reactor polymer to second reactor polymer being in the range of about 0.67:1 to about 2:1.

5. The process defined in claim 3 wherein the blend has a melt index in the range of about 0.02 to about 3.5 grams per 10 minutes; a melt flow ratio in the range of about 55 to about 135; and a density in the range of 0.915 to 0.960 gram per cubic centimeter.

6. The process defined in claim 5 wherein the blend is produced under the following conditions:

in the first reactor:
   (1) the alpha-olefin is 1-hexene and is present in a ratio of about 0.02 to about 0.26 mole of alpha-olefin per mole of ethylene; and
   (2) hydrogen is present in a ratio of about 0.017 to about 0.18 mole of hydrogen per mole of ethylene; and in the second reactor:
- (1) the alpha-olefin is 1-hexene or 1-butene and is present in a ratio of about 0.01 to about 0.42 mole of alpha-olefin per mole of ethylene; and
- (2) hydrogen is present in a ratio of about 1.7 to about 2.2 moles of hydrogen per mole of ethylene.

7. The process defined in claim 6 wherein the blend has a melt index in the range of about 0.04 to about 2.0 grams per 10 minutes; a melt flow ratio in the range of about 55 to about 125; and a density in the range of 0.916 to 0.960 gram per cubic centimeter.

8. A gas phase process for the production of an in situ polyethylene blend wherein the polymer formed in the first reactor is a copolymer of ethylene, 1-hexene, and, optionally, one or more other up to 8 carbon atom alpha-olefins having a flow index in the range of about 0.2 to about 12 grams per 10 minutes and a density in the range of about 0.900 to about 0.940 gram per cubic centimeter and the polymer formed in the second reactor is a copolymer of ethylene, 1-butene and/or 1-hexene, and, optionally, one or more other up to 8 carbon atom alpha-olefins having a melt index in the range of about 50 to about 1000 grams per 10 minutes and a density in the range of about 0.910 to about 0.975 gram per cubic centimeter, the weight ratio of first reactor polymer to second reactor polymer being in the range of about 0.75:1 to about 1.6:1, comprising contacting ethylene and the aforementioned alpha-olefins with a magnesium/titanium based catalyst system including an activator and a cocatalyst in each of two fluidized bed reactors connected in series, under polymerization conditions, with the provisos that:

- (a) the mixture of ethylene copolymer matrix and active catalyst formed in the first reactor in the series is transferred to the second reactor in the series;
- (b) other than the active catalyst referred to in proviso (a) and the cocatalyst referred to in proviso (f), no additional catalyst is introduced into the second reactor;
- (c) in the first reactor in which a relatively high molecular weight copolymer is made:
  - (1) the alpha-olefin is present in a ratio of about 0.02 to about 0.26 mole of alpha-olefin per mole of ethylene; and
  - (2) hydrogen is present in a ratio of about 0.017 to about 0.18 mole of hydrogen per mole of ethylene;
- (d) in the second reactor in which a relatively low molecular weight copolymer is made:
  - (1) the alpha-olefin is present in a ratio of about 0.01 to about 0.42 mole of alpha-olefin per mole of ethylene; and
  - (2) hydrogen is present in a ratio of about 1.7 to about 2.2 moles of hydrogen per mole of ethylene;
- (e) a sufficient amount of one or more hydrocarbons is added to the first reactor or to the mixture formed in the first reactor prior to its introduction into the second reactor to provide about 3 to about 12 parts by weight of hydrocarbon(s) per 100 parts by weight of the in situ blend, each of said hydrocarbons being a saturated alicyclic hydrocarbon, which is liquid at the temperature at which polymerization is effected in the reactors, is essentially amorphous, and contains less than about 15 percent by weight paraffin wax, said amount of hydrocarbon(s) added being in the range of about 3 to about 30 parts by weight of hydrocarbon(s) per 100 parts by weight of the mixture of ethylene copolymer matrix and active catalyst formed in the first reactor; and
- (f) additional hydrocarbyl aluminum cocatalyst is introduced into the second reactor in an amount sufficient to restore the level of activity of the catalyst transferred from the first reactor to about the initial level of activity in the first reactor.

9. The process defined in claim 8 wherein each hydrocarbon has a viscosity in the range of about 200 to about 1000 SUS at 100 degrees C. and each hydrocarbon has a molecular weight in the range of about 200 to about 5000.

10. The process defined in claim 9 wherein the amount of hydrocarbon(s) introduced into the first reactor or prior to the second reactor is about 4 to about 20 parts by weight of hydrocarbon(s) per 100 parts by weight of the mixture of ethylene copolymer matrix and active catalyst formed in the first reactor.

* * * * *